United States Patent [19]

Kiss et al.

[11] Patent Number: 5,205,866
[45] Date of Patent: Apr. 27, 1993

[54] METHOD FOR MAKING GREY-BLACK INCLUSION PIGMENTS

[75] Inventors: Akos Kiss, Alzenau-Wasserlos; Dietrich Speer, Hanau; Peter Kleinschmit, Hanau; Jenny Horst, Gelnhausen, all of Fed. Rep. of Germany

[73] Assignee: Degussa Aktiengesellschaft, Frankfurt am Main, Fed. Rep. of Germany

[21] Appl. No.: 857,074

[22] Filed: Mar. 12, 1992

Related U.S. Application Data

[63] Continuation of Ser. No. 580,386, Sep. 11, 1990, abandoned.

[30] Foreign Application Priority Data

Sep. 18, 1989 [DE] Fed. Rep. of Germany ....... 3931092

[51] Int. Cl.$^5$ .......................... C08K 3/36; C08K 3/04
[52] U.S. Cl. ................................ 106/450; 106/400; 106/401; 106/472; 106/475; 106/481
[58] Field of Search ............... 106/450, 400, 401, 472, 106/475, 481

[56] References Cited

U.S. PATENT DOCUMENTS 3,189,475  6/1965  Marquis et al. ............. 106/450
4,047,970  9/1977  Morriss et al. .............. 106/450
4,482,390 11/1984  Airey et al. ................. 106/450
4,874,433 10/1989  Kiss et al. ................... 106/481
5,008,223  4/1991  Speer et al. ................. 106/450

FOREIGN PATENT DOCUMENTS 0294664 12/1988  European Pat. Off. .
 385247  3/1989  European Pat. Off. ........... 106/450
0385247  9/1990  European Pat. Off. .
0074779  3/1991  European Pat. Off. .
2312535  1/1981  Fed. Rep. of Germany .
3719051  6/1987  Fed. Rep. of Germany .
3906818  3/1989  Fed. Rep. of Germany .

OTHER PUBLICATIONS

Somasundaran, P. "Theories of Grinding" in: Onoda, Jr. et al. (ed.) Ceramic Processing Before Firing (New York, John Wiley & Sons, 1978), p. 116.

*Primary Examiner*—Mark L. Bell
*Assistant Examiner*—Scott L. Hertzog
*Attorney, Agent, or Firm*—Beveridge, DeGrandi, Weilacher & Young

[57] ABSTRACT

Gray-black inclusion pigments are made using zirconium silicate as the encasing substance and carbon black particles as the inclusion phase by annealing a mixture of zirconium dioxide, a source for silicon dioxide, carbon black and mineralizers under reducing conditions at 900°–1400° C. The process uses zeolites with an $SiO_2/Al_2O_3$ molar ratio of more than 4, preferably more than 10, as the $SiO_2$ source. The depth of the color can be increased by also using an adhesion agent, especially silicon oil. The use of the zeolites facilities the employment of different zirconium dioxide qualities and permits the production of pigments with higher carbon black inclusion rates.

18 Claims, No Drawings

METHOD FOR MAKING GREY-BLACK INCLUSION PIGMENTS

This application is a continuation of application Ser. No. 07/580,386, filed Sep. 11, 1990, now abandoned.

INTRODUCTION TO THE INVENTION

The present invention relates to a method for making gray-black inclusion pigments using zirconium silicate as the encasing substance, and encasing therewith carbon black particles as the discrete phase. The invention is carried out by calcining a mixture containing zirconium dioxide, carbon black and at least one mineralizer, under reducing conditions, at between 900° and 1400° C. In more detail, zeolites with an $SiO_2/Al_2O_3$ molar ratio of more than 4, are used as the source for the silicon dioxide used in the process of the invention.

The pigments of the invention are suitable for use in glazes and in glass.

Inclusion pigments are known, for example, from German Pat. No. 23 12 535. They consist of transparent crystals of glaze-stable substances such as, for example, zirconium silicate, zirconium dioxide, or tin dioxide, into which are encapsulated inorganic, water-free, colored compounds as a discrete phase. Thenard's blue (cobalt blue), titanium yellow and especially cadmium yellow and cadmium red are mentioned as colored compounds in this connection. Also known is zirconium-iron-pink with $Fe_2O_3$ inclusions in a zirconium silicate encasing. Such inclusion pigments are made by calcining the encasing substances or their raw materials, and the colored substances to be sealed in or their raw materials, in the absence of mineralizers, up to temperatures of as much as 1400° C.

Gray-black inclusion pigments were described for the first time in German patent application P 39 06 818.8 that are suitable for colorization of glazes for ceramic bodies and surfaces. These gray-black inclusion pigments are zirconium silicate as the encasing substance, in which are enclosed carbon black particles with a specific surface of 10 to 1000 $m^2/g$.

These previously described gray-black inclusion pigments are made by annealing a mixture consisting of zirconium dioxide, silicon dioxide, and carbon black in the presence of mineralizers under reducing conditions in covered reaction vessels. According to the above German application, the zirconium dioxide must exhibit a particle size distribution (D50 Value) between 7 and 10 $\mu m$ and a specific surface of between 2 and 4 $m^2/g$. Furthermore, one must use carbon black with a specific surface of 10 and 1000 $m^2/g$ in a quantity of up to 50% by weight, related to zirconium silicate. The mixture must be raised to a temperature of between 900° and 1400° C. at the fastest possible heating speed and must be calcined there between half-an-hour and eight hours. After this calcining process, there is a follow-up calcining under oxidizing conditions to remove the carbon black part that was not sealed in.

The gray-black pigments, which are produced according to the above-mentioned prior known method, are color neutral. In other words, these prior art pigments exhibit "a" and "b" values close to 0 in the CIE lab color system (see German Industrial Standard DIN 5033, 6164, 6174). The brightness values L (100=white, 0=black) of a transparent glaze that contains 5% pigments and which is calcined for 1 hour at 1060° C. are generally above 40.

The L value decreases as the carbon black inclusion rate increases. Therefore an interest exists in sealing in the largest possible quantity of carbon black when making the pigment. According to the previously known method, as shown in analysis it was impossible to increase the carbon black concentration beyond 0.5% by weight based on zirconium silicate. In order to attain L values essentially below 40 at constant pigment concentration of 5% by weight in transparent glaze, there was thus needed a new production method for the specific inclusion pigments in order to raise the inclusion rate of carbon black.

Another restriction on the method used in the past for making carbon black inclusion pigments was the fact that only very special zirconium dioxides could be used in order to facilitate the sealing-in of carbon black. The use of zirconium dioxides with a particle size distribution of more than 7 to 10 $\mu m$ and a specific surface of more than 2 to 4 $m^2/g$ led only to white or bright-gray products without carbon black inclusions.

SUMMARY OF THE INVENTION

An object of the invention is to provide a method for making gray-black inclusion pigments forward of carbon black particles encased in zirconium silicate which will permit the manufacture of the darkest possible pigments with L values of below 40 in a 5% by weight transparent glaze.

Another object is to increase the choice of usable zirconium dioxides, whereby the L value of the pigments can also be greater than 40, using $ZrO_2$ qualities in addition to those heretofore considered as being the only suitable ones.

In attaining the above and other objects, one feature of the invention resides in a method for obtaining gray-black inclusion pigments using zirconium silicate as the encasing substance for encapsulation of carbon particles as a discrete phase. In further detail, the method is carried out by calcining a mixture containing zirconium dioxide, a source for silicone dioxide, carbon black, and at least one mineralizer, under reducing conditions, at between 900° and 1400° C. for between half-an-hour and 8 hours. A feature of the invention is that one uses a zeolite with an $SiO_2/Al_2O_3$ molar ratio of more than 4, specially more than 10, as the source for the silicon dioxide in the process.

By means of the measure according to the invention involving the use of zeolites with a molar ratio between $SiO_2$ and $Al_2O_3$ amounting to more than 10, it is possible to increase the carbon black inclusion rate in the zirconium silicate encasing to values of greater than 0.5% by weight up to about 1% by weight. According to the method described in German patent application P 39 06 818.8, on the other hand, only gray-black pigments with inclusion rates in the range of 0.2 and 0.5% by weight were obtainable. The higher carbon black inclusion rates of the pigments made according to the invention correspond to L values of less than 40 in the transparent glaze that are obtained by coloring with 5% by weight pigments and fired under standardized conditions. According to the invention, one can make pigments under the mentioned standard conditions, with L values in a range of between about 20 to 40, preferably between 25 and 35.

Zeolites with an $SiO_2/Al_2O_3$ molar ratio of more than 4, are suitable as a source for silicon dioxide for the formation of zirconium silicate as indicated above. It should be noted that Y or Z zeolites, with a $SiO_2/Al$-

$_2O_3$ molar ratio of more than 4, can also be used; but by using partly or predominantly de-aluminized zeolites, more color-intensive pigments are obtained. One preferably uses zeolites with an $SiO_2/Al_2O_3$ molar ratio of about 10 or preferably more than that. Suitable zeolites as of the ZSM 5-type with a molar ratio of around 30 as well as so-called silicalites with an even lower aluminum content that have the same structure as ZSM 5 or ZSM 11. Zeolites with an aluminum content of less than 1% by weight, based on the sum of Si and Al, which also includes the silicalites, are preferred.

The mixture to be calcined can, in addition to the zeolite with the $SiO_2/Al_2O_3$ molar ratio of more than 4, also contain other sources for silicon dioxide, such as quartz, as well as precipitated or pyrogenic silica. It can readily be determined in the course of a preliminary experiment what quantity of this additional $SiO_2$ source can be used along with the rest of the components. It is preferable to use the zeolite as the sole $SiO_2$ source.

Zirconium dioxide and silicon dioxide, in the form of zeolite, including possibly additionally present other $SiO_2$ sources, are preferably employed in equimolar quantities to form the zirconium silicate encasing. An excess of up to 20 mole percent of zirconium dioxide does not have any advantageous effect on pigment formation. On the other hand, an excess of silicon dioxide leads to an undesirable increase in the L value of the pigment that is formed.

In addition to the zirconium dioxide qualities with specific limiting values for the particle size and the specific surface area, such as was necessary to use in the prior known method (German patent application, P 39 06 818.8), one can now also use $ZrO_2$ types having a D50 value of less than 7 or greater than 10 μm for the particle size distribution and whose specific surface area is greater than 4 $m^2/g$. Even the use of Baddeleyite, a naturally occurring $ZrO_2$ mineral, permits the formation of carbon black $ZrSiO_2$ inclusion pigments although the L values thus attainable are about 40.

Different carbon black types can be encapsulated in the zirconium silicate casing according to the invention. Carbon blacks with a specific surface area of between 10 and 100 $m^2/g$, especially between 30 and 1020 $m^2/g$, and agglomerate sizes of between 1 and 15 μm, are preferred.

The presence of at least one mineralizer is required for pigment formation in accordance with the invention. Suitable mineralizers in particular are fluorides of lithium, sodium, magnesium, and calcium; calcium fluoride being particularly advantageous. The optimum quantity of mineralizer can be easily determined by preliminary experiments. In general, very good results are achieved with between 0.05 and 0.2 mole $CaF_2$ per mole of zirconium dioxide.

It is known from EP-A 0 294 664, which relates to the production of inclusion pigments based on zirconium silicate as the encapsulation substance, that one can use as the pigmenting substance one or more initial starting materials for the pigmenting substance, which can be bound to and/or into a zeolite.

A $SiO_2/Al_2O_3$ molar ratio of a zeolite in the range of between 1 and 10 is considered advantageous in order to be able to form the initial compounds of the pigmenting substances into the zeolite via ionic exchange or to the internal surfacing of the pores.

It could not be expected that, in the process according to the invention, the inclusion rate of carbon black into zirconium silicate can be increased through the use of zeolites with a high $SiO_2/Al_2O_3$ molar ratio as the $SiO_2$ source. This is so because the carbon black particles, when added to the mixture to be calcined, exhibit particle sizes that are greater than the pore width of the zeolites used.

The components of the mixture to be calcined are thoroughly mixed and homogenized prior to calcining. Based on the weight of zirconium silicate, the mixture contains up to 50% by weight carbon black, preferably between 10 and 30% by weight. Carbon blacks with a D50 value of less than 2 μm are particularly preferred. By means of particularly intensive grinding of all components combined in a mill with high shearing forces, for example, in a high-speed hammer mill, one can obtain more color-intensive pigments than by means of pretreatment in a conventional ball mill.

The calcining process applied to the mixture takes place in a conventional manner at between 900° and 1400° C., preferably at between 1000° and 1300° C., within a period of time between half-an-hour and eight hours, preferably, between 1 and 2 hours at about 1200° C. The mixture to be calcined is preferably supplied to the furnace in a previously compacted state in order to accelerate the solid reaction between $ZrO_2$ and the $SiO_2$ source. To guarantee a reducing atmosphere, the calcining mixture located in covered fire-proof vessels, such as fire-proof clay or corundum vessels, is covered with a layer of sugar or preferably carbon black. The heating rate for the purpose of reaching the calcining temperature can be between 200 and 1000 K/hr; heating rates of about 500 K/hr are preferred. After the calcining process, the pigment, optionally after prior comminution, is re-calcined in oxidizing conditions, preferably for about 1 hour at about 1000° C. in air in order to burn out the carbon black that is not completely encased with zirconium silicate.

According to a preferred embodiment of the invention, the mixture to be calcined contains a liquid, non-volatile adhesion agent, in addition to the $SiO_2$, $ZrO_2$, carbon black and mineralizer. This adhesion agent is mixed together with the remaining components. In this way, one can make very color-intensive pigments. The function of the adhesion agent is to bring the particles participating in the formation of the inclusion pigment together with each other in intensive contact. As the liquid, non-volatile adhesion agent, one can use those compounds that exhibit a high affinity both to the hydrophobic surface of the carbon black and to the surface of the zeolite plus a high degree of thermal stability. Particularly suitable adhesion agents are silicone oils that are added to the mixture to be calcined in a quantity of less than 10% by weight, preferably 3-7% by weight, each time based on the weight of the mixture. To assure a homogeneous distribution of the adhesion agent, it is advantageous to dissolve the agent, for the purpose of reducing the viscosity, in a low-viscosity solvent-petroleum ether is quite suitable and to add it to the mixture to be calcined in this form and to mix it.

The color-neutral inclusion pigments made according to the invention are gray-black; in a simple manner and with a small color interval from charge to charge, one can obtain products here that exhibit L values far below 40 on a 5% basis in a standard transparent glazing. The assortment of usable zirconium dioxides is expanded by the present invention. Another advantage of the pigments made according to the invention resides in their stability in grinding. The gray-black inclusion pigments made according to the invention can be used for coloring glazes and glass streams.

DETAILED EMBODIMENT OF THE INVENTION

The following examples will explain the invention in greater detail:

EXAMPLES 1 TO 5

Inclusion pigments, using different zirconium dioxide qualities: mixtures of 3.25 grams silicalite (<1% $Al_2O_3$), 1.25 grams carbon black (D50 value, 1.3 μm specific surface 60 $M^2/g$, 6.0 grams $ZrO_2$ (material data according to table), 0.39 grams $CaF_2$ and 0.5 grams silicone oil in 1 gram of petroleum ether were mixed for 5 minutes in a high-speed hammer mill, heated up in the die furnace at 1000 K/hr and calcined for 1 hour at 1200° C. under reducing conditions and re-calcined in the conventional manner for the purpose of burning out unencapsulated carbon black in air at 1000° C. The lab color values were determined in a transparent glaze containing 5% by weight pigment.

| Example | 1 | 2 | 3 | 4 | 5 |
|---|---|---|---|---|---|
| $ZrO_2$ D50 value (μm) | 9.3 | 3.4 | 3.9 | 6.6 | 33.7 |
| specific surface ($m^2/g$) | 2.2 | 6.6 | 5.2 | 5.2 | 2.9 |
| Color values | | | | | |
| L | 27.73 | 30.01 | 37.67 | 37.70 | 37.08 |
| a | −0.1 | −0.05 | −0.08 | −0.03 | −0.04 |
| b | 0.17 | 0.16 | 0.51 | 0.80 | 0.43 |

EXAMPLES 6 TO 9

The mixtures given in the table were mixed for 5 minutes in a high-speed hammer mill and were then heated up in a chamber furnace under a reducing atmosphere at the heating rates indicated and were then calcined each time for one hour at 1200° C. After re-calcining for 1 hour at 1000° C. in air, the lab color values were determined in a transparent glaze in a 5% color content. The $Al_2O_3$ content of the Silicalite used, was below 1% by weight; the carbon black exhibited a D-50 value of 1.3 μm and a specific surface area of 60 $m^2/g$; the $ZrO_2$ had a D-50 value of 9.3 μm and a specific surface area of 2.2 $m^2/g$.

| Example | | 6 | 7 | 8 | 9 |
|---|---|---|---|---|---|
| Silicalite | (g) | 6.5 | | 6.5 | |
| Carbon black | (g) | 5.0 | | 5.0 | |
| $ZrO_2$ | (g) | 12.0 | | 12.0 | |
| $CaF_2$ | (g) | 0.78 | | 0.78 | |
| Silicon oil | (g) | 1.0 | | — | |
| Heating rate (K/hr) | | 300 | 500 | 300 | 500 |
| Color values | | | | | |
| L | | 28.55 | 25.31 | 30.58 | 27.70 |
| a | | −0.06 | −0.07 | −0.05 | −0.07 |
| b | | 0.22 | 0.41 | 0.43 | 0.03 |

The comparison of Example 6 with Example 7 or Example 8 with Example 9 shows the influence of the heating rate on pigment formation; here, 500 K/hr proves advantageous as compared to 300 K/hr.

The comparison between Examples 6 and 8 or between 7 and 9 shows the color-intensifying influence as a result of the concomitant use of silicone oil.

EXAMPLES 10 TO 11

To determine the influence of the mixing or grinding intensity of the mixture to be calcined, the mixture indicated below was ground for 1 hour in a ball mill (Example 10) or for 5 minutes in a high-speed hammer mill (Example 11) and was then calcined in the die furnace as shown in Examples 1 to 5.

| Example | | 10 | 11 |
|---|---|---|---|
| Silicalite (<1% $Al_2O_3$) | (g) | | 3.25 |
| Carbon black (D50 = 1.3 μm; 60 $m^2/g$) | (g) | | 2.5 |
| $ZrO_2$ (D50 = 9.3 μm; 2.2 $m^2/g$) | (g) | | 6.0 |
| $CaF_2$ | (g) | | 0.39 |
| Silicon oil | (g) | | 0.5 |
| Petroleum ether | (g) | | 1.0 |
| Mixture grinding type | | ball mill 1 hour | hammer mill 5 minutes |
| Color values (5% in transparent glaze) | | | |
| L | | 35.3 | 30.06 |
| a | | −0.05 | −0.07 |
| b | | −0.44 | −0.12 |

The pigment in Example 11 exhibits a D-50 value of 31 μm. After 30 minutes of ball mill grinding, the D-50 value dropped to 12.3 μm, the lab values, however, changed only little with L=30.71, a=0.10, b=0.18. This shows that the pigments are stable under grinding.

EXAMPLES 12 TO 13

A mixture of 6.5 grams de-aluminized Y-zeolite ($Al_2O_3$ content below 1% by weight, 90% by weight $SiO_2$, 0.11% by weight $Na_2O$, residue moisture) 2.5 grams carbon black (D-50 value=1.3 μm, specific surface 60 $m^2/g$), 12.0 grams, $ZrO_2$ (D-50 value=9.3 μm, specific surface 2.2 $m^2/g$), 0.63 grams $CaF_2$, was treated, in the absence of silicon oil (=Example 12) or in the presence of 1 gram of silicon oil, that had been dissolved in 2 grams of petroleum ether (=Example 13) for 5 minutes in an intensive mill and was then calcined in a reducing manner in the die furnace at 1300° C. for 1 hour and was then re-calcined in an oxidizing manner. The color values of the 5% pigmentation in a transparent glaze are indicated in the table.

| Example | 12 | 13 |
|---|---|---|
| L | 38.3 | 35.5 |
| a | −0.12 | −0.09 |
| b | 1.55 | 1.2 |

Further variations and modifications of the foregoing will become apparent to those skilled in the art and are intended to be encompassed by the claims appended hereto.

We claim:

1. A method for making gray-black inclusion pigments based on zirconium silicate as the encasing substance into which are enclosed carbon black particles as the discrete phase, comprising forming a mixture containing the components zirconium dioxide, a source of silicon dioxide, carbon black and at least one mineralizer; heating said mixture under reducing conditions at between 900° and 1400° C., wherein the source for the silicon dioxide is zeolite with an $SiO_2/Al_2O_3$ molar ratio of about 10 or more than about 10, to thereby obtain an inclusion pigment, wherein said inclusion pigment has a L value below 40 in a 5% by weight transparent glaze.

2. The method according to claim 1, wherein the heating is conducted for ½ to 8 hours.

3. The method according to claim 1, wherein the zeolite has an aluminum content of less than 1% by weight.

4. The method according to claim 3, wherein the zeolite is a silicalite.

5. The method according to claim 1, wherein equimolar quantities of zirconium dioxide and silicon dioxide in the form of zeolite are used.

6. The method according to claim 1, wherein the mineralizer is selected from the group consisting of LiF, NaF, $MgF_2$, $CaF_2$ and mixtures thereof.

7. The method according to claim 6, wherein the mineralizer is $CaF_2$.

8. The method according to claim 1, further comprising intensively mixing zirconium dioxide, the $SiO_2$ source, carbon black, and mineralizer together, in the presence of a liquid, non-volatile adhesion agent.

9. The method according to claim 8, wherein the adhesion agent is silicon oil in a quantity of less than 10% by weight, related to the mixture.

10. The method according to claim 1, wherein the carbon black has a specific surface area of between 30 and 120 $m^2/g$ and an agglomerate size of between 1 and 15 μm.

11. The method according to claim 1, wherein the carbon black is present in the amount of between 1 and 30% by weight, related to the mixture.

12. A gray-black inclusion pigment made by the method of claim 1.

13. A gray-black inclusion pigment made by the method of claim 8.

14. The method according to claim 1, wherein said zirconium dioxide has a D50 value of less than 7 or greater than 10 μm.

15. The method according to claim 1, wherein said zirconium dioxide has a specific surface area greater than 4 $m^2/g$.

16. The method according to claim 1, wherein the carbon black inclusion rate in said zirconium silicate encasing substance is greater than 0.5% by weight and is less than about 1% by weight.

17. The method according to claim 1, wherein said inclusion pigment has a L value between about 20 to 40.

18. The method according to claim 17, wherein said inclusion pigment has a L value between 25 and 35.

* * * * *